J. S. LYLE.
MACHINE FOR CLEANING AND SEPARATING COTTON.
APPLICATION FILED AUG. 17, 1909.
969,762. Patented Sept. 6, 1910.
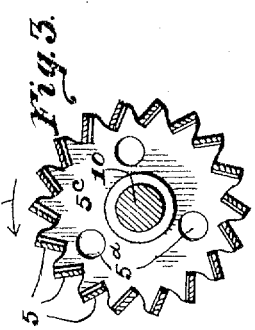
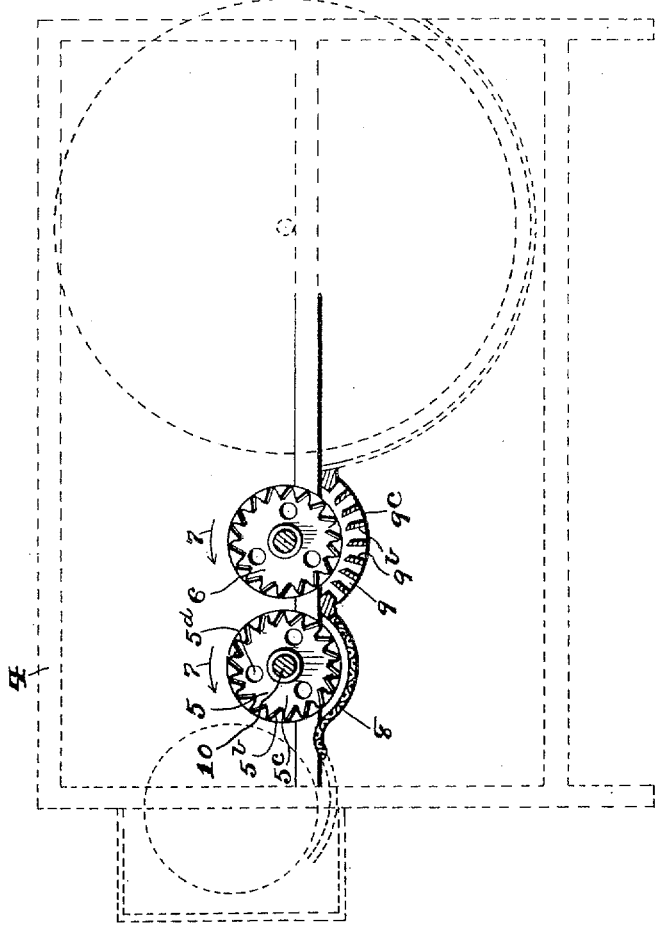
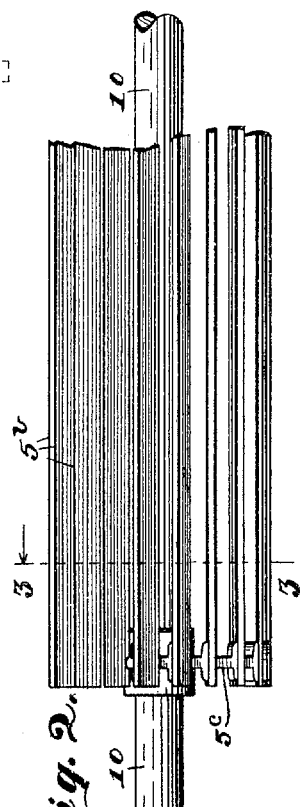
Witnesses: Inventor:
John S. Lyle.
By Frank P. Shepard, Atty.

UNITED STATES PATENT OFFICE.

JOHN S. LYLE, OF McCLOUD, OKLAHOMA.

MACHINE FOR CLEANING AND SEPARATING COTTON.

969,762. Specification of Letters Patent. Patented Sept. 6, 1910.

Application filed August 17, 1909. Serial No. 513,328.

*To all whom it may concern:*

Be it known that I, JOHN S. LYLE, a citizen of the United States, residing at McCloud, in the county of Pottawatomie and State of Oklahoma, have invented certain new and useful Improvements in Machines for Cleaning and Separating Cotton, of which the following is a full, clear, and exact description, reference being had to the drawings hereto annexed.

On the fifth day of March, 1907, Letters Patent No. 846,329, were issued to me for a machine for cleaning and separating cotton from its impurities. In the machine shown in said Letters Patent, two rollers are journaled, each of these rollers being solid and having its peripheral surface ribbed or fluted longitudinally to act upon the cotton and cotton bolls. Below each of these rollers is a concave surface, against which the cotton and cotton bolls are rubbed and broken by the ribs of said rollers, these concaves being each made of screen wire so that the dust, dirt, and other impurities which are loosened from the cotton may pass through them.

The object of the present invention is to so improve the construction and operation of these rollers and their co-acting concaves that they will more nearly accomplish the desired results in breaking open the cotton bolls and in separating the bolls and impurities from the cotton. In carrying out this object, the inventor has designed and constructed the improvements shown by the accompanying drawings, in which:

Figure 1 is a sectional view of a machine embodying my improvements, the improved parts being shown in full lines, while the other parts are shown in dotted lines. Fig. 2 is an enlarged fragmental front elevation of one of the improved rollers. Fig. 3 is a sectional view, on same scale, taken on the line 3—3 of Fig. 2, or in the same direction as Fig. 1. The left-hand side of Fig. 1 represents the front of the machine.

Referring to the several figures, in all of which like numerals of reference designate like parts, the numeral 4 designates the inclosing casing or main framework, which is shown in Fig. 1 in dotted lines and is not unlike the corresponding portion of the machine shown in the Letters Patent above named. Within this casing 4 two rollers 5 and 6 are journaled, these rollers being each shown in full lines and differing from the rollers shown in said Letters Patent in the manner later described. In the operation of the machine these rollers 5 and 6 revolve in the direction indicated by their indicating arrows 7. The first roller, 5, has a co-acting concave 8 mounted under it, this concave being made of screen wire having about a three-eighths-inch mesh and being a continuation of the screen wire which forms another concave, not shown. The second roller 6, has a co-acting concave 9 mounted under it, this concave being composed of a number of slats $9^b$ which extend parallel with the axis of said roller 6 and are secured at their ends to arc-shaped supports $9^c$ on the side walls of the casing 4. Each of these slats $9^b$ is disposed with its line of width coinciding with the radius line of the roller 6, so that dust, dirt and parts of hulls may drop down through between them as the cotton and bolls are worked rearward across the concave 9 by the revolution of said roller. The upper edges of the slats $9^b$, adjacent the roller 6, are beveled rearwardly, so as to present a sharp front edge against which the cotton bolls and hulls are broken by the action of said roller. The roller 5 is hollow and in the form of a cage, being composed of slats $5^b$ which are secured at their ends to cast-metal heads $5^c$ mounted tightly on the shaft 10. The lines of width of the slats $5^b$ are, at an angle to the radius of the roller 5 which they form, so that during operation of the machine said slats do not tend to take a permanent hold on the cotton or bolls, but work said cotton and bolls across the concave 8 with a rubbing or wiping action that breaks the bolls open and aids in releasing the dirt and impurities from the cotton. The roller 6 is exactly like the roller 5 in all respects.

In addition to the action of the rollers and concaves described, the angled position of the slats $5^b$ causes a strong draft of air to radiate from the rollers 5 and 6 between said slats as said rollers revolve, the heads or ends $5^c$ of the rollers being provided with inlet openings $5^d$ to allow air to enter to replace the air thrown out between said slats.

In the use of the machine, the cotton and cotton bolls, just as they are gathered from the field, or after having been worked upon by some previous part of the machine not shown herein, are passed through between the first roller 5 and its co-acting concave 8, the rubbing, rolling, and agitating action of said roller and concave breaking up the bolls or parts of bolls and releasing dirt and impurities, while the draft of air thrown out of said roller passes down through said concave and carries said dirt and impurities with it. After the cotton leaves the concave 8 it passes between the roller 6 and the concave 9, the sharp front edges of the slats 9$^b$ causing the cotton hulls and bolls to be still more completely broken up while being drawn over said concave and also loosening and releasing more dirt and other impurities. The strong draft of air thrown out of the roller 6 passes down between the slats 9$^b$ of the concave 9 and carries away the dirt and impurities loosened from the cotton on said concave.

The foregoing being a full, clear, and exact description of the invention, what I claim and desire to secure by Letters Patent is:

A machine for cleansing and separating cotton, comprising a casing with hollow rollers having heads journaled in said casing, said heads having a plurality of inlet air openings therein, said rollers provided with slats arranged at an angle to the radius thereof, one of the rollers having a reticulated concave arranged beneath the same, the other roller being arranged parallel with the first mentioned roller and having a support beneath the same parallel with a row of upwardly extended slats thereon arranged in concave form, the upper ends of said slats being rearwardly beveled to provide sharp front cutting edges which extend parallel with the axis of said roller, the angled position of the rollers permitting of air to radiate when said rollers revolve, and the inlet openings adapted to replace the air.

Witness my hand this 30th day of July, 1909.

JOHN S. LYLE.

Witnesses:
 N. DOUGLAS,
 B. B. GLASS.